US00RE41410E

(19) United States
(12) Reissued Patent
Seki

(10) Patent Number: US RE41,410 E
(45) Date of Reissued Patent: Jun. 29, 2010

(54) VEHICLE DECELERATION CONTROL APPARATUS

(75) Inventor: Masato Seki, Toyota (JP)

(73) Assignee: Toyota Jidosha Kabushiki Kaisha, Toyota (JP)

(21) Appl. No.: 12/010,813

(22) Filed: Jan. 30, 2008

Related U.S. Patent Documents

Reissue of:
(64) Patent No.: 7,280,902
Issued: Oct. 9, 2007
Appl. No.: 11/037,155
Filed: Jan. 19, 2005

(30) Foreign Application Priority Data

Feb. 13, 2004 (JP) ..... 2004-035941
Nov. 25, 2004 (JP) ..... 2004-341265

(51) Int. Cl.
*G06F 19/00* (2006.01)

(52) U.S. Cl. ..... 701/70; 701/79; 701/96; 701/300; 701/58; 701/68; 701/110; 180/244; 180/275; 180/325

(58) Field of Classification Search ..... 701/58, 701/68, 70, 79, 110, 93; 280/244, 275, 325; 477/185, 186, 187

See application file for complete search history.

(56) References Cited

U.S. PATENT DOCUMENTS

| | | | | | |
|---|---|---|---|---|---|
| 5,978,724 | A | * | 11/1999 | Sekine | 701/70 |
| 6,129,423 | A | * | 10/2000 | Hashimoto | 303/125 |
| 6,401,024 | B1 | | 6/2002 | Tange et al. | |
| 2006/0097504 | A1 | * | 5/2006 | Akaba et al. | 280/806 |

FOREIGN PATENT DOCUMENTS

| | | |
|---|---|---|
| JP | A-01-168531 | 7/1989 |
| JP | A 05-024492 | 2/1993 |
| JP | A 08-175348 | 7/1996 |
| JP | A 08-253056 | 10/1996 |
| JP | A 11-123953 | 5/1999 |
| JP | A 2000-198371 | 7/2000 |
| JP | A 2000-355233 | 12/2000 |
| JP | A 2001-018680 | 1/2001 |

* cited by examiner

*Primary Examiner*—Tuan C To
*Assistant Examiner*—Redhwan Mawari
(74) *Attorney, Agent, or Firm*—Oliff & Berridge, PLC

(57) ABSTRACT

If a driver of a vehicle has slowed-down the vehicle, a deceleration controller does not apply deceleration to the vehicle within a specified time after the driver has finished slowing-down of the vehicle. The deceleration controller is a device that automatically decelerates the vehicle if a distance between the vehicle and another vehicle running in front of the vehicle is less than a specific distance to avoid collision of the two vehicles.

9 Claims, 4 Drawing Sheets

| CONTROLLED DISTANCE | RELATIVE SPEED | | | | |
|---|---|---|---|---|---|
| | ... | 15 km/h | 20 km/h | 25 km/h | ... |
| ... | ... | ... | ... | ... | ... |
| 10m | ... | Gt(10,15) | Gt(10,20) | Gt(10,25) | ... |
| 15m | ... | Gt(15,15) | Gt(15,20) | Gt(15,20) | ... |
| 20m | ... | Gt(20,15) | Gt(20,20) | Gt(20,25) | ... |
| ... | ... | ... | ... | ... | ... |

VEHICLE DECELERATION CONTROL APPARATUS

Matter enclosed in heavy brackets [ ] appears in the original patent but forms no part of this reissue specification; matter printed in italics indicates the additions made by reissue.

BACKGROUND OF THE INVENTION

1) Field of the Invention

The present invention relates to a technology for slowing down speed of a vehicle in response to a relation of the vehicle with an object.

2) Description of the Related Art

Now-a-days some of the cars are provided with a vehicle deceleration control apparatus. The vehicle deceleration control apparatus detects another vehicle running in front of the vehicle, and automatically slows-down the speed of the vehicle if a distance between the vehicle and the another vehicle is less than a specific distance that allows safe driving. The vehicle deceleration control apparatus detects the other vehicle and distance between the vehicle and the other vehicle using, for example, radar waves. The control of lowering the speed of the vehicle will be called as deceleration control.

Some vehicle deceleration control apparatuses stop the deceleration control while the driver is accelerating the vehicle, by pressing the accelerator pedal (accelerator override) or so, and start the deceleration control again once the accelerator override has been terminated. However, if the deceleration controller is performed immediately after the termination of the accelerator override, the driver feels uncomfortable due to a phenomenon called a deceleration shock.

As a countermeasure, Japanese Patent Application Laid Open (JP-A) No. 2001-18680 discloses to insert a time gap between a timing at which the accelerator override ends and a timing at which the deceleration controller is to be started again. In other words, it is assumed that the driver is intentionally approaching the other vehicle, and the driver has intentionally slowed-down the vehicle; so that, the deceleration controller is not performed.

JP-A No. 2000-355233 discloses another conventional technology. Assume that a vehicle is following (chasing) another vehicle, the vehicle temporarily stops following the other vehicle and restarts following the other vehicle. The technology disclosed in JP-A No. 2000-355233 teaches to limit lowering the speed of the vehicle to a specific speed while the vehicle has temporarily stopped following the other vehicle. This arrangement reduces the unpleasant deceleration shock.

JP-A No. 2001-18680 and JP-A No. 2000-355233 each discloses a technique to reduce the unpleasant deceleration shock; however, the driver can feel uncomfortable even immediately after the driver lowers the speed of the vehicle. This is explained in detail below.

Drivers often intentionally slow-down vehicle by applying brakes, or the vehicle usually slow-down while the gears are being shifted. If the deceleration control is applied immediately after the vehicle has slowed-down, the vehicle is slowed-down further so that the driver feels that the vehicle has slowed-down in excess than what he has anticipated. This make the drivers uncomfortable.

SUMMARY OF THE INVENTION

It is an object of the present invention to provide an arrangement so that the driver does not feel uncomfortable even if the vehicle slows-down in excess of what he has anticipated.

A vehicle deceleration control apparatus according to an aspect of the present invention is mounted on a vehicle and includes a detector that detects a parameter that represents a relationship with an object; a deceleration controller that decelerates the vehicle based on the parameter, a deceleration-operation detector that detects whether the vehicle is subjected to a deceleration operation; and a deceleration-application prohibiting unit that prohibits the deceleration controller from applying deceleration to the vehicle. When the deceleration-operation detector detects an end of a deceleration operation, the deceleration-application prohibiting unit is activated for a specified period to prohibit the deceleration controller from applying deceleration to the vehicle.

The specified period is decided based on the parameter.

The specified period is set shorter if a target deceleration decided based on the parameter is larger.

If a speed of the vehicle is high, the specified period is set shorter as compared with a case when the speed is low.

The specified period is set short in either one of a case where the object and the vehicle are approaching each other and a case where the object and the vehicle are close to each other.

The specified period is either one of a specified time and a specified travel distance.

The vehicle deceleration control apparatus further includes a risk determining unit that determines amount of risk when the deceleration-application prohibiting unit is activated; and an invalidation unit that invalidates activation of the deceleration-application prohibiting unit if the amount of risk determined by the risk determining unit is higher than a specified value.

The risk determining unit obtains the amount of the risk based on any one or more of a possibility in which the driver does not notice danger in front, possibility in which the driver does not perform appropriate deceleration operation, and a distance between the object and the vehicle.

The deceleration-application prohibiting unit continues prohibiting deceleration from being generated even while the deceleration-operation detector is detecting whether the driver performs the deceleration operation.

A vehicle deceleration control apparatus according to another aspect of the present invention is mounted on a vehicle and includes a detector that detects a parameter that represents a relationship with an object; a deceleration controller that decelerates the vehicle based on the parameter; a deceleration-operation detector that detects whether the vehicle is subjected to a deceleration operation; and a deceleration-application suppressing unit that suppresses deceleration to the vehicle applied by the deceleration controller. When the deceleration-operation detector detects an end of a deceleration operation, the deceleration-application suppressing unit is activated for a specified period to suppress deceleration of the vehicle.

The specified period is decided based on the parameter.

The specified period is set shorter if a target deceleration decided based on the parameter detected is larger.

The specified period is either one of a specified time and a specified travel distance.

The vehicle deceleration control apparatus further includes a risk determining unit that determines an amount of risk when the deceleration-application suppressing unit is activated; and an invalidation unit that invalidates activation of the deceleration-allocation suppressing unit if the amount of risk determined by the risk determining unit is higher than a specified value.

The deceleration-application suppressing unit continues suppressing deceleration applied even while the deceleration-operation detector is detecting whether the driver performs the deceleration operation.

The other objects, features, and advantages of the present invention are specifically set forth in or will become apparent from the following detailed description of the invention when read in conjunction with the accompanying drawings.

DETAILED DESCRIPTION

Exemplary embodiments of the present invention are explained in detail below with reference to the accompanying drawings.

Figure 1:
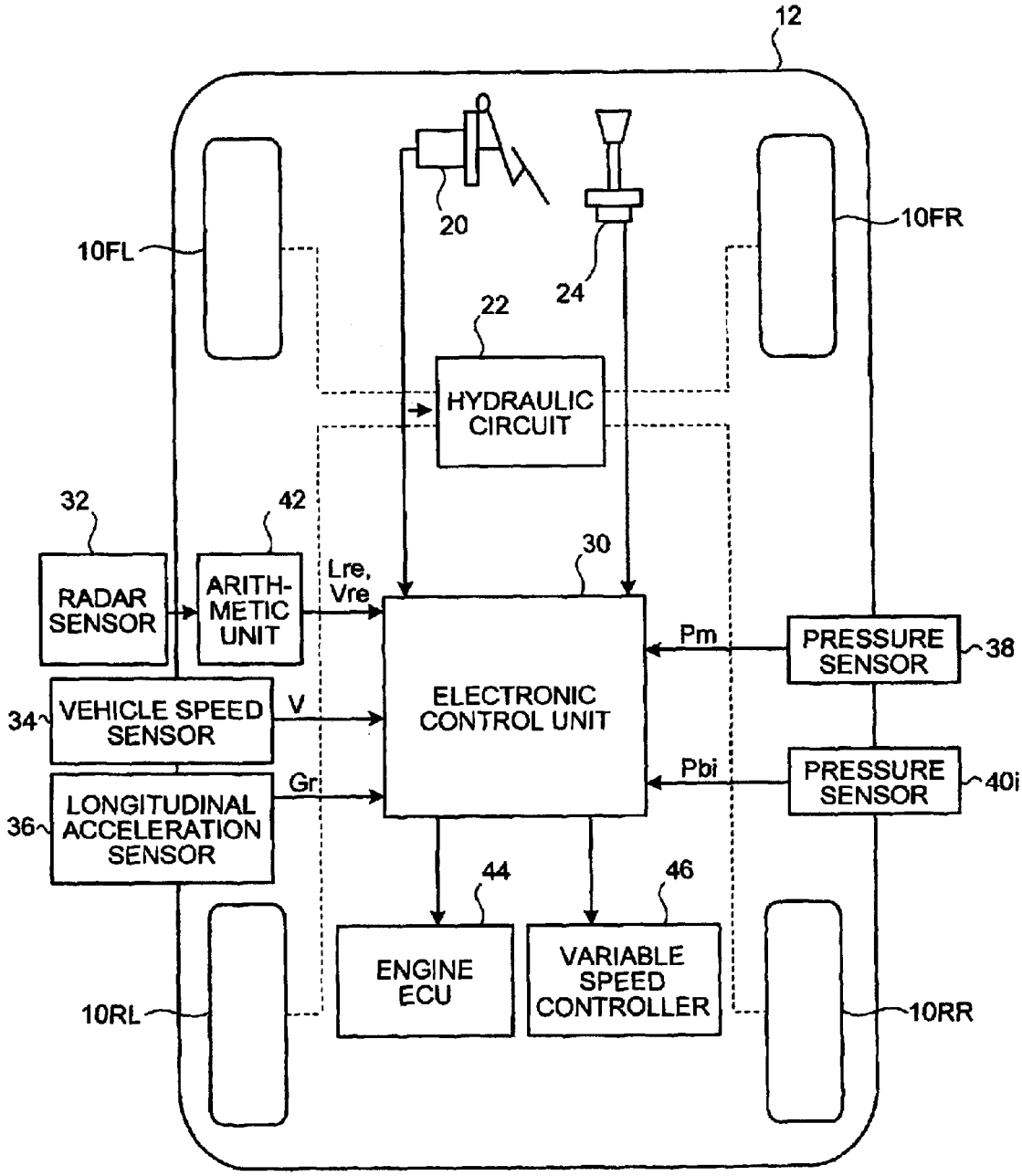
FIG. 1 is a block diagram of a vehicle deceleration control apparatus according to an embodiment of the present invention.

FIG. 1 is a block diagram of a vehicle deceleration control apparatus according to an embodiment of the present invention. The vehicle deceleration control apparatus is mounted on a vehicle 12.

The vehicle 12 has four wheels: a front left wheel 10FL, a front right wheel 10FR, a rear left wheel 10RL, and a rear right wheel 10RR. The wheels 10FL and 10FR serve as driven wheels and steered wheels.

A hydraulic circuit 22 conveys a braking pressure to all the wheels to control braking of the wheels. The hydraulic circuit 22 includes a reservoir, an oil pump, and various types of valve units. The braking pressure of wheel cylinders is generally controlled by a master cylinder that is operated according to a press-down operation of a brake pedal by the driver, and is controlled by an electronic control unit 30 as required.

The vehicle 12 includes a radar sensor 32 and an arithmetic unit 42. The radar sensor 32 is provided on the front side of the vehicle. The radar sensor 32 outputs and receives radio waves, such as millimeter waves, or laser beams to detect a vehicle (hereinafter, "preceding vehicle") running in front of the vehicle 12. The arithmetic unit 42 calculates a relative distance Lre and a relative speed Vre between the vehicle 12 and the preceding vehicle based on the result of detection by the radar sensor 32. The vehicle 12 also includes a vehicle speed sensor 34 that detects the speed (hereinafter, "vehicle speed") V of the vehicle 12; a longitudinal acceleration sensor 36 that detects longitudinal acceleration Gr of the vehicle 12; and a pressure sensor 38 that detects pressure (hereinafter, "master cylinder pressure") Pm of the master cylinder. If Vf is the speed of the preceding vehicle and Vs is the speed of the vehicle 12, then a relative speed Vre between the two vehicles is Vs-Vf.

The preceding vehicle can be detected using image recognition or inter-vehicle communication. On the other hand, any other means can be used to obtain the relative speed and the relative distance between the vehicle 12 and the preceding vehicle.

As shown in FIG. 1, signals as explained below are input into the electronic control unit 30. The signals includes signals indicating a relative distance Lre and a relative speed Vre obtained by the front-side detector, a signal indicating a vehicle speed V detected by the vehicle speed sensor 34, a signal indicating an actual deceleration Gr detected by the longitudinal acceleration sensor 36, a signal indicating master cylinder pressure Pm detected by the pressure sensor 38, and a signal indicating braking pressure Pbi of wheels detected by a pressure sensor 40i.

Figure 2:
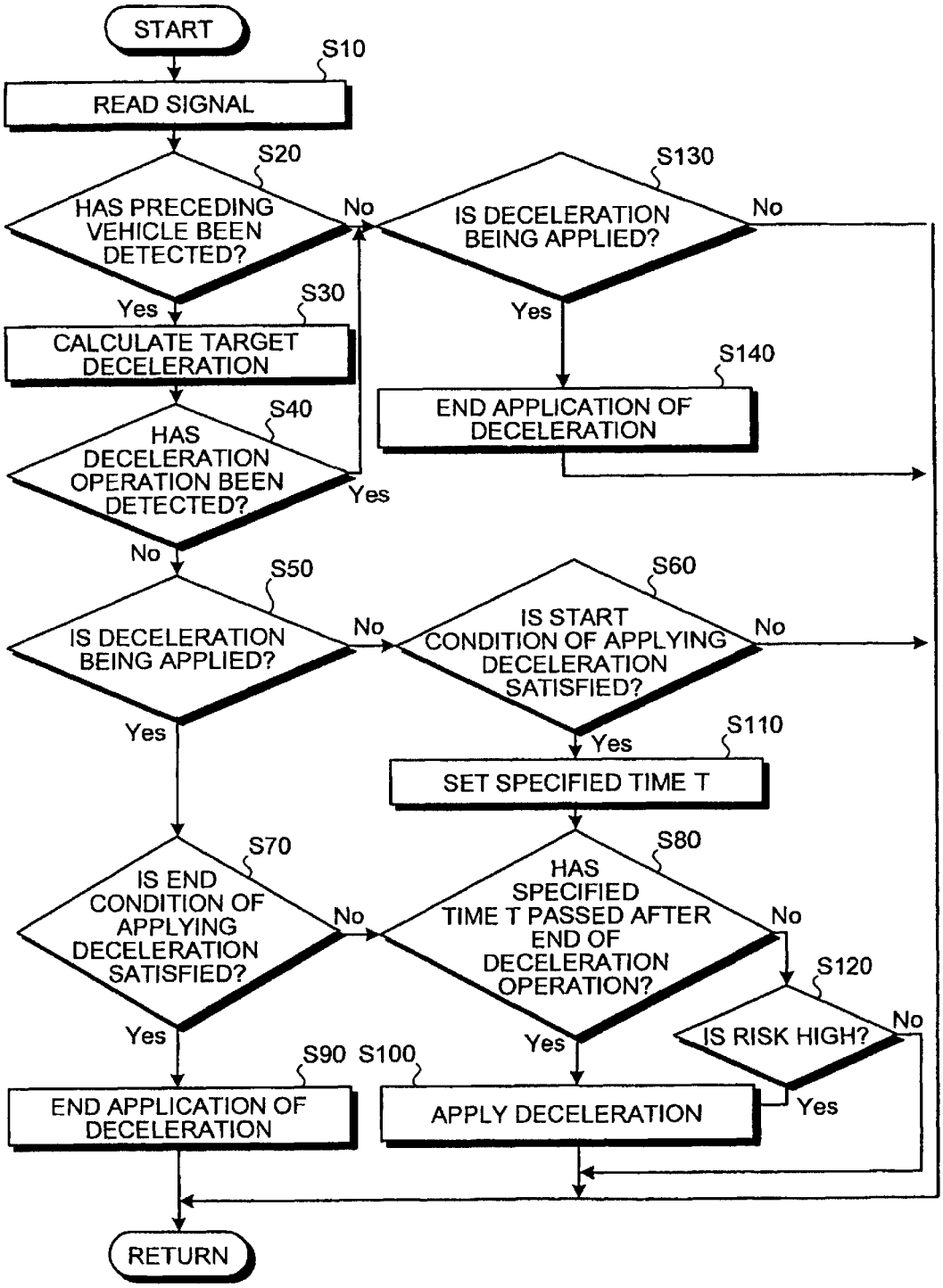
FIG. 2 is a flowchart of a process procedure performed by a deceleration controller according to the embodiment.

A deceleration control routine according to the embodiment is explained below with reference to a flowchart of FIG. 2. It should be noted that an object in front of the vehicle 12 is described as a preceding vehicle and a specified period is described as a specified time T for simplicity of explanation, but the present invention is not limited thereto. The control with reference to the flowchart of FIG. 2 is started through an operation of a switch for activating the vehicle deceleration control apparatus, and is repeatedly executed in each specified cycle.

At step S10, the signal indicating the relative distance Lre and the relative speed Vre obtained by the front-side detector and read. At step S20, it is determined whether any vehicle in front of the vehicle 12 is detected, based on the signal from the radar sensor 32. If a negative determination is made at step S20 (NO), the control passes to step S130, while if an affirmative determination is made at step S20 (YES), the control passes to step S30.

Figures 3, 4:
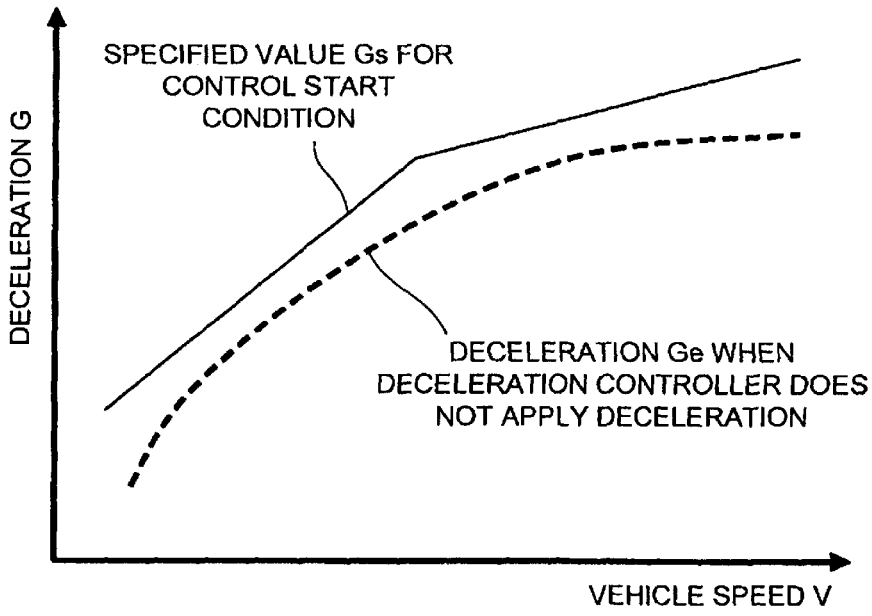
FIG. 3 is a map for deciding a target deceleration from a relative speed between a vehicle and another vehicle and a controlled distance.
FIG. 4 is a graph representing a relationship between a specified value for a control start condition and the speed of the vehicle.

At step S30, a target deceleration Gt is decided (calculated) by a target deceleration map as shown in, for example, FIG. 3 based on the relative distance Lre, the relative speed Vre, and a speed of the vehicle (vehicle speed) 12. A controlled distance of FIG. 3 is obtained by equation (1) from a target following distance and a relative distance, and the target following distance is obtained by equation (2) from, for example, a target headway (time between vehicles) and the vehicle speed.

$$\text{Controlled distance}=\text{target following distance}-\text{relative distance} \quad (1)$$

$$\text{Target following distance}=\text{target headway}\times\text{vehicle speed} \quad (2)$$

Wherein the headway expresses how many seconds the vehicle 12 takes at a vehicle speed at a certain time to travel the relative distance with the preceding vehicle at the certain time, and the target headway is a target time of the time between vehicles. As shown in the equation (2), a relative distance, i.e., a target following distance indicates a distance obtained by multiplying the target headway by a target time at the vehicle speed at the certain time. The target headway may be set as a fixed value or may be set by the driver. For example, three buttons for selecting a short time, an intermediate time, and a long time may be prepared in advance, and the driver operates an arbitrary one of the buttons to set a time interval so that it becomes a desired time between vehicles. The target deceleration map has values preset such tat the values become greater with the increase in the relative speed and the values become greater with the increase in the controlled distance.

For example, if the relative distance is short, or if the target following distance is long, the controlled distance becomes greater by the equation (1), and the target deceleration map outputs a greater value. Because, if the relative distance is short, deceleration is needed to increase the relative chamber. If the target following distance is long (equation (2)), it is considered that the vehicle speed is higher or the target headway set is longer. This also requires deceleration in order to increase the relative distance. The higher the relative speed is, the higher the risk of collision with a preceding vehicle is. Therefore, the target deceleration is set larger.

Furthermore, the target deceleration is obtained by a two-dimensional map including the relative speed and the controlled distance. The two-dimensional map is allowed to have values preset such that the values are small if the controlled distance is short even if the relative speed is high or if the relative speed is low even if the controlled distance is long. It is thereby possible to prevent a case as follows. The case is such that the target deceleration tends to be set larger if the relative speed is high yet the controlled distance is short and the risk of collision with a preceding vehicle is low and this causes the deceleration control which makes the driver have uncomfortable feeling. Although the two-dimensional map includes the controlled distance and the relative speed, this map has an element such as the controlled distance including the vehicle speed, which makes it possible to set a more adequate target deceleration.

One example of deciding the target deceleration is shown in the embodiment, but the present invention is not limited thereto. As described in Japanese Patent Application No. 2003-118536 that has been applied by the inventors of the present invention, the target deceleration may be decided from the relative distance and the relative speed between the vehicle and the preceding vehicle.

At step S40, a deceleration-operation detector that detects any deceleration operation by a driver determines whether the driver performs any deceleration operation. For example, the deceleration-operation detector detects a brake operation using a brake sensor 20 that detects whether the driver performs the brake operation, or a shift-down operation using a shift-down sensor 24 that detects whether the driver performs the shift-down operation.

The operation detected by the deceleration-operation detector is not limited by the example. The operation may be performed in any mode if it expresses the driver's intention to decelerate the vehicle 12. For example, a brake pedal operation by the driver is known, and other operations such as the shift-down operation, an operation of an auxiliary brake, and an operation of quickly returning the accelerator pedal may be performed.

At step S40, if an affirmative determination is made, this means that the driver her performed any of the deceleration operations. Therefore, since it is determined that there has been an intention of the driver to decelerate the vehicle 12, the deceleration controller does not apply deceleration, and the control passes to step S130. On the other hand, at step S40, if a negative determination is made, the control passes to step S50.

At step S50, it is determined whether the deceleration controller is applying the deceleration. If a negative determination is made, then the control passes to step S60, while if an affirmative determination is made, then the control passes to step S70.

At step S60, it is determined whether the target deceleration Gt obtained at step S30 is greater than a specified value Gs for a start condition of applying deceleration that is decided depending on the vehicle speed as shown in FIG. 4. If a negative determination is made, then it is determined that the deceleration controller does not need to apply the deceleration, and the control passes to Return, while if an affirmative determination is made, the control passes to step S110. It is noted that the start condition of applying deceleration is a criteria used to determine whether the deceleration controller needs to apply the deceleration.

As shown in FIG. 4, the specified value Gs for the start condition of applying deceleration is set larger if the vehicle speed is higher. This is because the deceleration controller is prevented from applying deceleration if the vehicle speed is high and the target deceleration Gt is low. The reason is that the running resistance of an engine brake or so becomes larger if the vehicle speed is higher to obtain a high level of deceleration even if the deceleration control is not performed.

It is most adequate to set a slightly larger value, than deceleration GE according to a vehicle speed generated when the deceleration is not applied by the deceleration controller, as a specified value for the start condition of applying deceleration. This is because if adequate deceleration is obtained for the vehicle 12 even if the deceleration controller does not apply deceleration, the deceleration controller is not allowed to start applying deceleration so that it is prevented to apply deceleration more than required.

Based on the specified value Gs decided in the above manner for the start condition of applying deceleration, if it is determined at step S60 that deceleration does not need to be applied by the deceleration controller, the deceleration controller is not allowed to apply deceleration. It is thereby possible to prevent deterioration in fuel cost due to excessive deceleration of the vehicle 12 that is more than the necessity, or to prevent reduction in braking force due to heating of a brake friction pad.

In the embodiment, it is determined based on the target deceleration Gt whether the start condition of applying deceleration, which is used to apply deceleration by the deceleration controller, is satisfied. However, this determination may be performed in any known method in the technology field if it is performed based on the relative distance Lre and the relative speed Vre. For example, an allowance for approaching |Lre/Vre| may be calculated to determine whether it is necessary to start applying deceleration by comparing the allowance with the specified value.

At step S70, it is determined whether the target deceleration Gt obtained at step S30 is smaller than a specified value GE for an end condition of applying deceleration. If a negative determination is made, the control passes to step S80, while if an affirmative determination is made, the control passes to step S90, where the deceleration controller ends the application of deceleration. It is noted that the specified value GE for the end condition of applying deceleration is also decided by a vehicle speed.

At step S110, a specified time T is set, and the control passes to step S80. The specified time T may arbitrarily be set as an experimental case so that the driver does not feel uncomfortable, or may be set variable depending on a value of the target deceleration.

Figure 5:
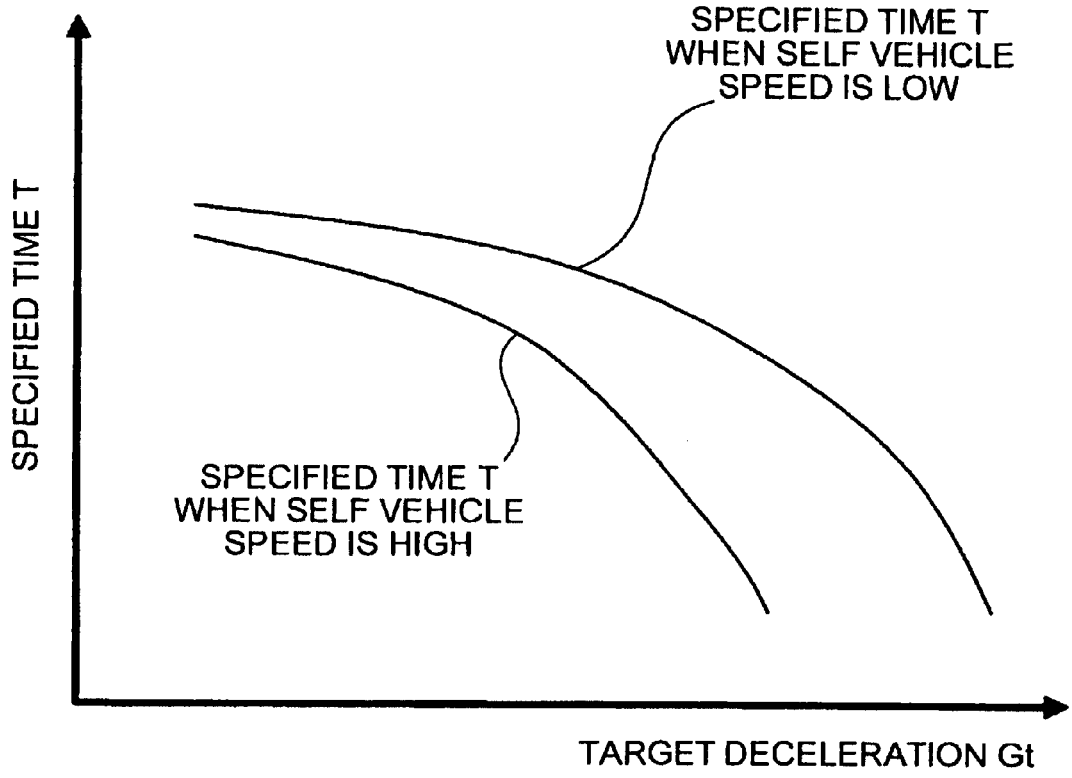
FIG. 5 is a graph for deciding a relationship between target deceleration and time.

For example, the specified time T may be set shorter if the target deceleration Gt is larger, as shown in FIG. 5. This is because the risk of collision with a preceding vehicle is higher if the target deceleration Gt is larger, and therefore, the deceleration controller applies deceleration as quickly as possible. On the other hand, if the target deceleration Gt is small, the risk of collision with a preceding vehicle is low. Therefore, the specified time T is set long.

As shown in FIG. 5, since the risk of collision with a preceding vehicle is higher if the vehicle speed is higher, it is also considered that the specified time T is set shorter than that when the vehicle speed is low.

At step S80, it is determined whether the specified time T has passed since the driver finishes the deceleration operation. If a negative determination is made, this means that it is immediately after the driver finishes the deceleration operation. Therefore, the deceleration controller is prohibited from applying deceleration, and the control passes to step S120. If an affirmative determination is made, the specified time T has passed since the driver performs the deceleration operation. Therefore, it is determined that the deceleration controller is allowed to apply deceleration, and the control passes to step S100, where the deceleration controller applies deceleration.

How to determine whether the specified time T has passed since the driver finishes the deceleration operation may be realized in the following manner. For example, a time, at which the deceleration operation is last detected by the deceleration-operation detector, is stored in a memory unit. At step S80, if a difference, between the time and a time at which a deceleration-allocation prohibiting unit refers to whether the specified time T has passed, is larger than the specified time T, then it may be determined that the specified time T has passed.

The unit to determine whether the specified time T has passed is not limited to the above-mentioned one. It should be noted that it is apparent for persons skilled in the art that other different embodiments are possible within the scope of the present invention. Assume that a vehicle deceleration control apparatus performs the control M-cycles for one second, which means the processes in the flowchart of FIG. 2 are executed M times for one second. It is possible to determine based on the assumption that the specified time T has not passed during a time from the cycle when the deceleration operation is last detected by the deceleration-operation detector to the time when the number of cycles N have passed, the number of cycles N being expressed by equation (3):

$$N=T/M \tag{3}$$

where T is in seconds.

Although it is determined herein whether the specified time T has passed, the point herein is that the deceleration controller is not allowed to apply deceleration during a period when the drive feels it as the period immediately after the deceleration operation. Therefore, the specified period may be a specified time T, a specified travel distance, and a period practically equivalent to the specified time T or the specified travel distance.

At step S120, the risk of collision is obtained from a relative relationship with a preceding vehicle. The risk may occur when the vehicle 12 is not decelerated immediately. For example, there is a case where it is determined from the relative relationship with a preceding vehicle that collision surely occurs or where the possibility of collision is very high, although it is immediately after the driver finishes the deceleration operation. In such a case, it is desirable that the deceleration controller apply deceleration at once. Therefore, the control passes to step S100, where the deceleration controller applies deceleration at once.

The application of deceleration by the deceleration controller is not limited by the above example. For example, a direction of driver's eyes is recognized to determine how often the driver takes his/her eyes off the road. If it is frequent, it is quite possible that the driver may not notice danger in front. Therefore, a signal indicating that the risk is high may be output. Alternatively, the vigilance of the driver is determined, and if the vigilance is low, it is quite possible that the driver may perform inadequate deceleration operation. Therefore, it is desirable that the deceleration controller apply deceleration.

At step S90, the target deceleration Gt is made to gradually approach actual deceleration Gr, and the deceleration to be applied by the deceleration controller is thereby gradually decreased to zero. With this operation, the deceleration controller ends the application of deceleration.

At step S100, the deceleration controller applies deceleration to the vehicle 12 so that the actual deceleration Gr of the vehicle 12 reaches the target deceleration Gt, by performing controls for the hydraulic circuit 22, an engine electronic control unit (ECU) 44, and a variable speed controller 46.

At step S130, it is determined whether the deceleration controller is applying deceleration. This is because the deceleration controller is allowed to end application of the deceleration if it is determined at step S20 that the driver does not recognize a preceding vehicle or if it is detected at step S40 that the driver performs the deceleration operation. Therefore, if an affirmative determination is made, the control passes to step S140, where the process of applying deceleration is ended, and then the control passes to Return, while if a negative determination is made, then the control passes to Return.

According to the embodiment with reference to FIG. 2, it is determined at step S40 whether the driver performs any deceleration operation. If it is determined that the driver performs the deceleration operation, then the control passes to step S130. Thus, the deceleration controller does not apply deceleration, and the deceleration operation by the driver is most preferentially selected.

If the deceleration operation is not detected at step S40, then it is determined at step S50 whether the deceleration controller is applying deceleration. If it is determined that the deceleration controller is not applying deceleration, then it is determined at step S60 whether the start condition of applying deceleration is satisfied. If it is determined the start condition is satisfied, then it is determined at step S80 whether the specified time T has passed after the deceleration operation by the driver. If it has not passed, then it is determined that the driver has no intention of deceleration, and the process returns without application of deceleration by the deceleration controller.

With these operations, it is possible to prevent some uncomfortable feeling given to the driver caused by the deceleration applied by the deceleration controller that is immediately after the driver finishes the deceleration operation based on the driver's determination that the vehicle 12 has adequately been decelerated. On the other hand, if the specified time T has passed since the diver finishes the deceleration operation, the deceleration controller is allowed to apply deceleration. Therefore, the deceleration controller can apply deceleration based on a relationship with a preceding vehicle while the uncomfortable feeling given to the driver is decreased.

It is prohibited that the deceleration controller applies deceleration during the specified time T immediately after the deceleration operation by the driver. It is also prohibited at step S40 that the deceleration controller applies deceleration during the deceleration operation by the driver. Thus, it is possible to apply deceleration to the vehicle 12 as the driver desires during the deceleration operation by the driver.

At step S110, the specified time T is set based on the relative relationship with a preceding vehicle. For example, if the possibility of collision with a preceding vehicle is low, the specified time T is set longer, while the specified time T is set shorter if the possibility is high. Therefore, by starting applying deceleration by the deceleration controller at an appropriate timing, it is possible to ensure safety while minimizing the uncomfortable feeling given to the driver.

At step S120, if the driver does not look forward intensively, or if it is determined from a relation with a preceding vehicle that the risk of collision is very high, the control passes to step S100, where the deceleration controller applies deceleration at once before the specified time T has passed, thus, ensuring safety.

The deceleration-application prohibiting unit is a unit that prohibits the deceleration controller from applying deceleration. More specifically, the unit determines at step S80 whether the specified timed T has passed since the driver finishes the deceleration operation. If a negative determination is made, it is prohibited that the deceleration controller applies deceleration because it is immediately after the driver performs the deceleration operation, and the control passes to step S120.

A risk determining unit is a unit that determines at step S120 whether the risk is high when the deceleration-application prohibiting unit prohibits the deceleration controller from applying deceleration. For example, if it is determined from the relative relationship with a preceding vehicle that the deceleration controller needs to apply deceleration at once, the disk determining unit determines that prohibition of application of deceleration is dangerous, and outputs a signal indicating that the risk is high.

An invalidation unit is a unit that allows the deceleration controller to apply deceleration at once. More specifically, if it is determined at step S120 that the level of the risk output from the risk determining unit is higher than a specified risk, the control passes to step S100. In other words, if it is determined that the risk is high if the deceleration controller does not apply deceleration at once, the invalidation unit invalidates the deceleration-application prohibiting unit and applies deceleration at once.

The deceleration controller is a unit that sets a target deceleration at step S30 based on the relative relationship with an object in front detected by the front-side detector, and applies deceleration to the vehicle 12 at step S100 based on the target deceleration.

The deceleration controller is not limited by the one explained above. The deceleration controller may be a unit that applies deceleration to the vehicle 12 from the result of detection by the front-side detector. More specifically, the unit sets a target vehicle speed which the vehicle 12 has to reach, based on the relative relationship with a vehicle in front, and continues to apply deceleration at a specified deceleration until the vehicle speed reaches the target vehicle speed or less.

In the embodiment, although the vehicle speed is taken into account to decide the specified time T based on the target deceleration as a reference, the method of setting the specified time T according to the present invention may be performed in any mode know in the technological field if the setting is performed based on a relative relationship with a preceding vehicle. For example, if a following distance is short, the specified time T is set short, while if a relative speed is high, the specified time T is set short. In other words, the specified time T may be set short when it is determined based on the relative relationship with a preceding vehicle that the vehicle 12 is approaching the preceding vehicle or is close thereto.

Instead of setting the specified time T, a specified travel distance can be set to achieve similar effects.

In the embodiment, a deceleration-application suppressing unit suppresses application of deceleration. To reduce the uncomfortable feeling that the driver has, it is not preferable to prohibit application of deceleration, but the present invention is not limited thereto. In other words, deceleration to be applied may be reduced during a specified period from immediately after the deceleration operation is finished, as compared with that of any other cases. As explained above, even if the configuration is the one where application of deceleration is not prohibited, the level of deceleration applied immediately after the deceleration operation is finished is suppressed, as compared with that in a case where the deceleration-application suppressing unit is not provided. Therefore, the uncomfortable feeling that the driver has can be reduced. In this case, the risk determining unit obtains the risk of the case where application of deceleration by the deceleration controller is suppressed in the same manner as that in the above-mentioned embodiment. If the risk is higher than a specified risk, the invalidation unit can invalidate the operation of the deceleration-application suppressing unit. With this operation, the suppression of deceleration applied by the deceleration controller is released at once. Therefore, the deceleration controller applies deceleration without being suppressed.

In all the examples, although the relationship with a preceding vehicle is used, the present invention is not limited thereto. For example, it is apparent for persons skilled in the art that the same operation and effect are also obtained in a relationship with an obstacle, an animal, or a person on the road.

For example, the method of not applying deceleration by the deceleration controller within a specified time T since the driver performs the deceleration operation is explained in the embodiment. However, it makes the driver feel uncomfortable to control deceleration immediately after the control of acceleration or deceleration by the driver's intension. Therefore, the present invention is not limited to the deceleration operation by the driver, and the deceleration controller may not apply deceleration within a specified time T since the driver performs an acceleration operation.

According to one aspect of the present invention, if any deceleration operation by the driver is detected, application of deceleration by the deceleration controller is prohibited within a specified period after the driver finishes the deceleration operation. Therefore, even if the driver spontaneously determines that a relative distance with an object in front becomes shorter and performs any deceleration operation, the deceleration controller does not apply deceleration immediately after the driver finishes the deceleration operation. Thus, it is possible to prevent automatic application of deceleration immediately after the driver determines that the vehicle 12 has been sufficiently decelerated, and to reduce the uncomfortable feeling the driver has.

Furthermore, the specified period is set based on a relative relationship with an object in front. For example, there is a situation in which the relative distance of the vehicle 12 with respect to the object in front is decreasing rapidly. The situation is determined by detecting the relative relationship with the object in front, and the specified time is set shorter. By thus setting, the deceleration controller applies deceleration comparatively soon after the driver finishes the deceleration operation. On the other hand, if the following distance is long or if the relative speed is low, that is, when deceleration is not necessarily applied comparatively soon, deceleration control can be started after a comparatively long time has passed. As explained above, the deceleration controller applies deceleration at once if necessary, while if not necessary, the deceleration controller applies deceleration after an adequately long time has passed. This allows the uncomfortable feeling given to the driver to be reduced.

Moreover, the specified period is set by a target deceleration decided based on the relative relationship with the object in front. With this setting, if the vehicle 12 needs deceleration with respect to the object in front, the target deceleration is set larger. Therefore, the specified time is set shorter if the target deceleration is large. If it is determined that the target deceleration is large, i.e., the deceleration controller is highly required to apply deceleration, the deceleration controller applies deceleration after a comparatively short time has passed.

Furthermore, the specified period is set as either one of a specified time and a specified travel distance, and the deceleration controller applies deceleration after an appropriate time has passed. This allows the uncomfortable feeling given to the driver to be reduced.

Moreover, it is determined whether the risk is high when the deceleration controller does not apply deceleration. If it is determined that the risk is high, or if it is determined that it is dangerous if deceleration is not applied immediately, the deceleration-application prohibiting unit is invalidated, and the deceleration controller applies deceleration at once. With this operation, if the relative distance with the object in front is largely reduced and the risk of collision is high, or if the driver does not look frontward intensively, prohibition of application of deceleration by the deceleration controller is invalidated. Therefore, it is possible that the deceleration controller immediately applies deceleration to reduce the risk of collision with the object in front, and to reduce shock upon collision.

Furthermore, the deceleration controller is prohibited from generation of deceleration during a period when it is detected whether the driver performs any deceleration operation. If fine adjustment is applied to the vehicle speed by the driver's intention, the deceleration controller does not apply deceleration. Therefore, it is possible to prevent the uncomfortable feeling given to the driver. The uncomfortable feeling is caused by application of deceleration by the deceleration controller during the deceleration operation by the driver. It is also possible to generate deceleration according to the deceleration operation by the driver.

Moreover, if it is detected that the driver performs the deceleration operation, application of deceleration by the deceleration controller is suppressed within the specified period after the driver finishes the deceleration operation. Therefore, even if the driver spontaneously determines that a relative distance with an object in front becomes shorter and performs the deceleration operation, application of deceleration by the deceleration controller is suppressed immediately after the driver finishes the deceleration operation. Thus, it is possible to prevent automatic application of deceleration immediately after the driver determines that the vehicle 12 has been sufficiently decelerated, and to reduce the uncomfortable feeling the driver has.

Furthermore, the specified period is set based on the relative relationship with an object in front. For example, there is a situation here the relative distance between the vehicle 12 and the object in front is decreasing rapidly. The situation is determined by detecting the relative relationship with the object in front, and the specified period is set shorter. By thus setting, the suppression of deceleration applied by the deceleration controller is released comparatively soon after the driver finishes the deceleration operation, and the deceleration controller applies deceleration without being suppressed. On the other hands, if the following distance is long or the relative speed is low, i.e., when application of deceleration is not released comparatively soon, the suppression of deceleration applied by the deceleration controller is released after a comparatively long time has passed, and the deceleration controller applies deceleration without being suppressed. As explained above, the deceleration controller applies deceleration at once if necessary, while if not necessary, the suppression of deceleration applied by deceleration controller is released after an adequately long time has passed. This allows the uncomfortable feeling given to the driver to be reduced without suppression of deceleration applied by the deceleration controller.

Moreover, the specified period is set by a target deceleration decided based on the relative relationship with the object in front. With this setting, if the vehicle 12 needs deceleration with respect to the object in front, the target deceleration is set larger. Therefore, the specified time is set shorter if the target deceleration is large. By thus setting, if it is determined that the target deceleration is large, i.e., the deceleration controller is highly required to apply deceleration, suppression of deceleration applied by the deceleration controller is released after a comparatively short time has passed. Therefore, the deceleration controller can apply deceleration without being suppressed.

Furthermore, the specified period is set as either one of a specified time and a specified travel distance, and suppression of deceleration applied by deceleration controller is released after an appropriate time has passed. This allows the uncomfortable feeling given to the driver to be reduced because the deceleration controller applies deceleration without being suppressed.

Moreover, it is determined whether the risk is high when deceleration applied by the deceleration controller is suppressed. If it is determined that the risk is high, or if it is determined that it is dangerous if the suppression of deceleration applied it not released immediately and deceleration is applied without being suppressed, the deceleration-application suppressing unit is invalidated, and the suppression of deceleration applied by the deceleration controller is released at once, and the deceleration controller applies deceleration without being suppressed. With this operation, if the relative distance with the object in front is largely reduced and the risk of collision is high, or if the driver does not look frontward intensively, suppression of deceleration applied by the deceleration controller is invalidated. Therefore, it is possible to release the suppression of deceleration applied by the deceleration controller at once, apply deceleration by the deceleration controller without being suppressed, reduce the risk of collision with the object in front, and to reduce shock upon collision.

Furthermore, deceleration applied by the deceleration controller is suppressed during a period when it is detected whether the driver performs any deceleration operation. If fine adjustment is applied to the vehicle speed by the driver's intention, deceleration applied by the deceleration controller is suppressed. Therefore, it is possible to suppress the uncomfortable feeling given to the driver. The uncomfortable feeling is caused by application of deceleration by the deceleration controller without being suppressed during the deceleration operation by the driver. It is also possible to generate deceleration close to the deceleration according to the deceleration operation by the driver.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle deceleration control apparatus mounted on a vehicle, comprising:

a detector that detects a parameter that represents a relationship with an object;

a deceleration controller that decelerates the vehicle based on the parameter;

a deceleration-operation detector that detects whether the vehicle is subjected to a deceleration operation performed by a driver; and a deceleration-application prohibiting unit that prohibits the deceleration controller from applying deceleration to the vehicle, wherein, when the deceleration-operation detector detects an end of a deceleration operation performed by a driver, the deceleration-application prohibiting unit is activated for a specified period to prohibit the deceleration controller from applying deceleration to the vehicle.

2. The vehicle deceleration control apparatus according to claim 1, wherein the specified period is decided based on the parameter.

3. The vehicle deceleration control apparatus according to claim 1, wherein the specified period is set shorter if a target deceleration decided from the parameter is larger.

4. The vehicle deceleration control apparatus according to claim 1, wherein if a speed of the vehicle is high, the specified period is set shorter as compared with a case when the speed is low.

5. The vehicle deceleration control apparatus according to claim 1, wherein the specified period is set short in either one of a case where the object and the vehicle are approaching each other and a case where the object and the vehicle are close to each other.

6. The vehicle deceleration control apparatus according to claim 1, wherein the specified period is either one of a specified time and a specified travel distance.

7. The vehicle deceleration control apparatus according to claim 1, further comprising:

a risk determining unit that determines amount of risk when the deceleration-application prohibiting unit is activated; and an invalidation unit that invalidates activation of the deceleration-application prohibiting unit if the amount of risk determined by the risk determining unit is higher than a specified value.

8. The vehicle deceleration control apparatus according to claim 7, wherein the risk determining unit obtains the amount of the risk based on any one or more of a possibility in which the driver does not notice danger in front, possibility in which the driver does not perform appropriate deceleration operation, and a distance between the object and the vehicle.

9. The vehicle deceleration control apparatus according to claim 1, wherein the deceleration-application prohibiting unit continues prohibiting deceleration from being generated even while the deceleration-operation detector is detecting whether the driver performs the deceleration operation.

[10. A vehicle deceleration control apparatus mounted on a vehicle, comprising:

a detector that detects a parameter that represents a relationship with an object;

a deceleration controller that decelerates the vehicle based on the parameter;

a deceleration-operation detector that detects whether the vehicle is subjected to a deceleration operation performed by a driver; and a deceleration-application suppression unit that suppresses deceleration to the vehicle applied by the deceleration controller, wherein when the deceleration-operation detector detects an end of a deceleration operation performed by a driver, the deceleration-application suppressing unit is activated for a specified period to suppress deceleration of the vehicle.]

[11. The vehicle deceleration control apparatus according to claim 10, wherein the specified period is decided based on the parameter.]

[12. The vehicle deceleration control apparatus according to claim 10, wherein the specified period is set shorter if a target deceleration decided from the parameter is larger.]

[13. The vehicle deceleration control apparatus according to claim 10, wherein the specified period is either one of a specified time and a specified travel distance.]

[14. The vehicle deceleration control apparatus according to claim 10, further comprising:

a risk determining unit that determines an amount of risk when the deceleration-application suppressing unit is activated; and an invalidation unit that invalidates activation of the deceleration-application suppressing unit if the amount of risk determined by the risk-determining unit is higher than a specified value.]

[15. The vehicle deceleration control apparatus according to claim 10, wherein the deceleration-application suppressing unit continues suppressing deceleration applied even while the deceleration-operation detector is detecting whether the driver performs the deceleration operation.]

* * * * *